United States Patent [19]

Walles et al.

[11] Patent Number: 5,030,399
[45] Date of Patent: Jul. 9, 1991

[54] METHOD OF IN-MOLD SULFONATION OF MOLDED PLASTIC ARTICLE

[75] Inventors: Wilhelm E. Walles, Freeland; Tomkinson, Donald L., Auburn, both of Mich.

[73] Assignee: The Dow Chemical Company, Midland, Mich.

[21] Appl. No.: 439,700

[22] Filed: Jul. 12, 1989

Related U.S. Application Data

[62] Division of Ser. No. 237,366, Aug. 29, 1988, Pat. No. 4,861,250.

[51] Int. Cl.⁵ .................. B05D 7/02; B29C 49/00; B29C 71/00; C08F 8/36
[52] U.S. Cl. .................. 264/83; 264/523; 264/526; 427/237; 427/248.1; 427/255.4; 427/322; 427/400; 525/344
[58] Field of Search ............. 264/83, 232, 340, 523, 264/526; 427/237, 248.1, 255.4, 322, 400; 525/343, 344, 353

[56] References Cited

U.S. PATENT DOCUMENTS

| | | | |
|---|---|---|---|
| 2,832,696 | 4/1958 | Walles | 427/322 X |
| 2,937,066 | 5/1960 | Walles | 8/513 |
| 3,592,724 | 7/1971 | King, Jr. et al. | 428/340 |
| 3,613,957 | 10/1971 | Walles | 427/248.1 X |
| 3,625,751 | 12/1971 | Walles | 427/248.1 X |
| 3,629,025 | 12/1971 | Walles | 525/344 X |
| 3,740,258 | 6/1973 | Walles | 525/353 X |
| 3,862,284 | 1/1975 | Dixon et al. | 264/83 |
| 3,959,561 | 5/1976 | Walles | 428/412 |
| 4,220,739 | 9/1980 | Walles | 525/344 |
| 4,336,015 | 6/1982 | Rainville | 264/83 X |
| 4,396,567 | 8/1983 | Rainville | 264/83 |
| 4,615,914 | 10/1986 | Walles | 427/237 |

Primary Examiner—Leo B. Tentoni
Attorney, Agent, or Firm—Bruce M. Kanuch

[57] ABSTRACT

An in-mold sulfonation system for sulfonating the surface of plastic articles such as plastic containers during molding. Sulfur trioxide is introduced into a pre-mold chamber, converted to a relatively high pressure gaseous sulfur trioxide, and then injected into a mold such as a blow mold immediately before or immediately following full expansion of the formed plastic article in the mold cavity. Neutralization with a gaseous neutralizing agent follows. By controlling the timing and temperature of the in-mold sulfonation step it is possible to produce a plastic article having an effective barrier layer but containing a minimum of undesirable rinseable salts.

11 Claims, 1 Drawing Sheet

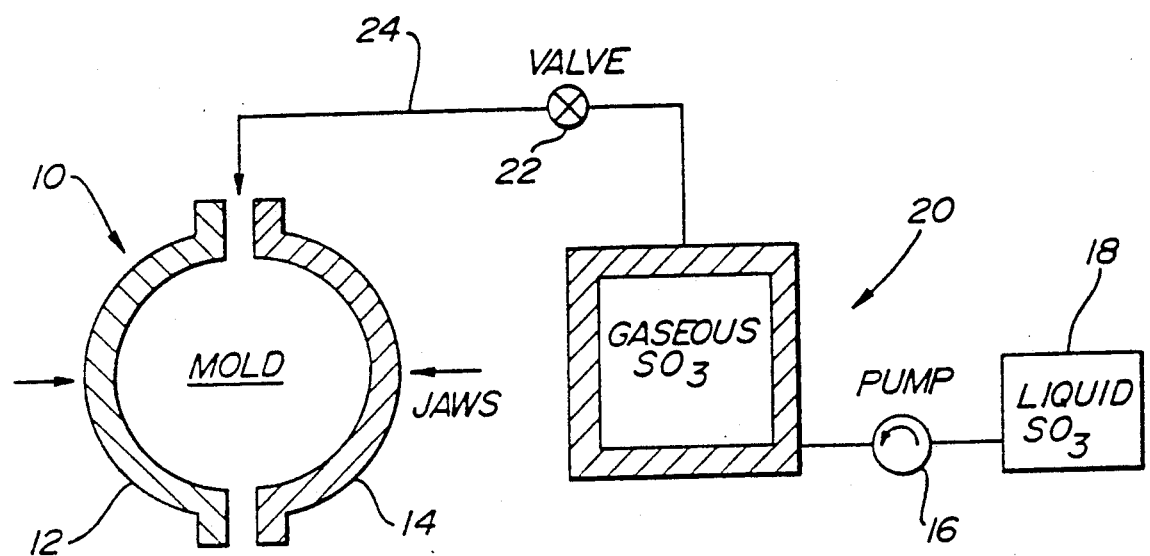

METHOD OF IN-MOLD SULFONATION OF MOLDED PLASTIC ARTICLE

This is a divisional of application Ser. No. 237,366, filed Aug. 29, 1988, now U.S. Pat. No. 4,861,250.

BACKGROUND OF THE INVENTION

This invention relates to an in-mold method and apparatus for sulfonating plastic articles during molding and to the sulfonated plastic articles so produced. More particularly, it relates to a system for injecting sulfur trioxide into a pre-mold chamber, forming a relatively high-pressure gaseous sulfur trioxide, and then, introducing the gaseous sulfur trioxide into the mold cavity during molding of plastic articles such as plastic containers.

The use of resinous organic polymers to fabricate enclosure members (plastic containers) such as bottles, tanks and other containers and other molded plastic articles is well known. Plastic containers which are made from most organic polymers, particularly the dominantly hydrocarbon polymers, are non-electroconductive, are non-adherent to polar materials such as inks, paints, dyes and various polar adhesives and are readily permeated and/or stress cracked or swollen by oleophilic materials such as liquid and gaseous hydrocarbons e.g., solvents, fumes, vapors, benzene, cyclohexane, xylene, chlorinated solvents, and hexane; gases such as nitrogen, oxygen, helium, hydrogen, carbon dioxide, methane, ethane, propane, butane, halocarbons; fuels such as gasoline, kerosene, fuel oils; oils such as natural fatty oils, lubricating oils, perfumes and agricultural chemicals. Depending on the particular polymer, these materials can adversely affect the container material. For example, natural fatty oils tend to cause stress cracking of polymers formed from olefinic monomers such as polyethylene. As a result of these inherent deficiencies many of such organic polymers must be treated with various agents which impart varying degrees of electroconductivity, adhesion and impermeability.

Sulfonation techniques have been developed as one means of treating plastic articles to decrease the permeability and protect the polymeric material. See, for example, Walles U.S. Pat. Nos. 2,832,696; 2,937,066; 3,592,724; 3,613,957; 3,625,751; 3,629,025; 3,740,258; 3,770,706; 3,959,561; 4,220,739 and 4,615,914. Of these, U.S. Pat. Nos. 3,613,957, 3,740,258 and 4,615,914 are particularly directed to plastic containers for organic fluids such as vehicle gasoline tanks and polyethylene drums for transport and storage of industrial solvents and the like.

Walles U.S. Pat. Nos. 3,613,957 and 3,740,258 relate to a post-mold treatment of plastic containers fabricated of non-aromatic hydrocarbon polymers. After the plastic containers have been extruded or molded, the surface to be sulfonated, preferably the interior surface of the plastic container, is exposed to gaseous sulfur trioxide, preferably diluted with a dry inert gas such as dry air. Alternatively, the interior surface may be contacted with a solution of sulfur trioxide in an inert liquid solvent, such as a liquid chlorofluorocarbon.

The interior surface sulfonated plastic containers are then substantially completely neutralized by contacting them with a dilute aqueous solution of alkali metal hydroxide, ammonium hydroxide, gaseous ammonia or other neutralizing agents. During the neutralization step, salts such as ammonium sulfate and ammonium sulfamate (when ammonia is used as the neutralizing agent) are formed. While such salts are rinseable and/or leachable, washing, rinsing and drying are required to remove these salts. This is especially necessary when the plastic container is to be used as a vehicle gasoline tank because residual salts are not soluble in gasoline and can clog the fuel line and/or fuel filter stalling or otherwise hindering the operation of the vehicle.

The washing, rinsing and drying steps are time consuming under any circumstances and are particularly so when the plastic container has a complicated shape which makes it difficult to thoroughly rinse and drain. With vehicle gasoline tanks, for example, it is often necessary to rinse completely and, then suspend the tank upside down for drainage and drying. The effort and time involved are considerable.

In Walles U.S. Pat. No. 4,615,914 the interior surfaces of plastic containers are post-mold treated by conversion of solid pills of polymeric sulfur trioxide into an air/sulfur trioxide gas mixture via microwave energy. This sulfonation process leaves no residue, but still upon neutralization with ammonia gas (which may be formed from solid ammonium carbonate), salts such as ammonium sulfamate and ammonium carbamate are produced. Accordingly, in Walles U.S. Pat. No. 4,615,914 rinsing is again suggested in order to remove such secondary reaction products.

The need which exists for a treatment process which alleviates the requirement for washing, rinsing and drying, has been met somewhat by use of an in-mold fluorination treatment. Dixon et al in U.S. Pat. No. 3,862,284 teach that in the blow molding of thermoplastic resins to produce plastic containers, 0.1–20% by volume fluorine and 99.9–80% by volume of an inert gas are blended into a fluid medium before expanding the parison of the plastic container to the contour of the mold. See also U.S. Pat. Nos. 4,336,015 and 4,396,567 to Rainville. Plastic containers produced by this process do not require washing, rinsing and drying. However, handling the fluorinating chemicals presents problems because of their corrosive and toxic nature. In addition the fluorinated surface does not provide as good a barrier layer as a sulfonated one.

An in-mold sulfonation system would, therefore, be desirable in that it could combine the best features of both post-mold sulfonation and in-mold fluorination and thereby eliminate many of the disadvantages of each. But, previously it has not been possible to satisfactorily conduct an in-mold sulfonation process. To a large extent this has been because it is difficult to inject gaseous sulfur trioxide into a mold which is under relatively high pressure and to control the time and temperature of the sulfonation treatment so as to achieve the deserved result.

Accordingly, the need exists for an effective and efficient in-mold sulfonation method and apparatus for sulfonating plastic articles during molding.

SUMMARY OF THE INVENTION

The present invention meets that need by providing a system for injecting sulfur trioxide, preferably pure liquid sulfur trioxide, into a pre-mold chamber where it is converted to a relatively high pressure gaseous sulfur trioxide and then, introducing the gaseous sulfur trioxide into the mold cavity immediately before or immediately after the plastic article is fully formed. The mold is preferably a blow mold or counter-current injection mold for molding thermoplastic resins under heat and pressure to produce plastic articles. The system is particularly applicable to blow molded plastic containers such as polyolefin vehicle gasoline tanks in order to sulfonate the interior surface of the plastic container during blow molding, but may also be used to sulfonate the surface of other plastic articles such as tubes, cartridges, and similar shaped articles.

In blow molding plastic containers mold pressures on the order of 80–100 psi are often encountered, especially when a tough thermoplastic resin such as high density polyethylene (which is typically used for vehicle gasoline tanks) is being molded. In the system of the present invention the sulfur trioxide is converted in the pre-mold chamber to a relatively high pressure gaseous sulfur trioxide. For example, the pressure of the gaseous sulfur trioxide in the pre-mold chamber may be in the range of approximately 100–120 psi. Because there is a fluid communication line between the pre-mold chamber and the mold, when the valve in that line is opened a measured amount of relatively higher pressure gaseous sulfur trioxide, i.e. the amount of gaseous sulfur trioxide produced from the charge of sulfur trioxide initially injected into the pre-mold chamber, is discharged from the pre-mold chamber and introduced into the relatively lower pressure environment in the mold.

It is desirable to introduce the gaseous sulfur trioxide immediately before or immediately after full expansion of the blow molded plastic article and before any significant cooling of the plastic article in the mold takes place. At that point in time the temperature of the plastic article is such that the sulfonation treatment will be most effective. Thus it has been found that upon neutralization with for example ammonia gas, the treated surface of the plastic article will have thereon a barrier layer primarily made up of $R-SO_3^-NH_4^+$ functional groups, wherein RH is the hydrocarbon of the organic polymer being treated, and will contain a minimum of $NH_2SO_3NH_4$ groups, i.e. undesirable water leachable, ammonium sulfate salt. Preferably, the molding step takes place at approximately 110° to 180° C., the pre-mold chamber, and consequently the sulfur trioxide gas, is at 80° to 140° C., and the sulfonation step lasts for approximately 0.1 to 2 min.

Likewise, as mentioned, it is desirable to neutralize any sulfonic acid groups formed during the sulfonation step with a neutralizing agent. Preferably a gaseous neutralizing agent such as ammonia gas is used. In the present system neutralization is followed by flushing with dry air, not rinsing. Thus, any remaining gaseous sulfur trioxide, gaseous neutralizing agent, and gaseous reaction products are vented and flushed from the mold cavity prior to cooling the surface sulfonated molded plastic article. If nearly 100% pure sulfur trioxide gas is used and if the moisture level of the carrier gas used in the neutralization step is controlled (a little moisture is desirable as an aid in neutralization, but only a little, i.e. less than about 1% based on $NH_3$), then few gaseous reaction products are encountered and the flushing operation is adequate to place the plastic article in condition for use upon cooling. No subsequent treatments, washings, or rinsings are required.

Rather, the molding/sulfonation cycle may be repeated without interruption. Thus, when the valve in the line between the pre-mold chamber and the mold is opened, the pump for charging the pre-mold chamber with liquid sulfur trioxide is shut down. Then, when the valve is closed, the pump is activated to inject another charge of liquid sulfur trioxide into the pre-mold chamber. There it is heated to convert it to relatively higher pressure gaseous sulfur trioxide. All of this takes place during the molding/sulfonation cycle for the preceding plastic article so that immediately upon completion of that cycle there is another supply of relatively high pressure gaseous sulfur trioxide ready for the next cycle. This is possible as long as the valve and the pump cannot open or operate at the same time.

Accordingly, it is an object of the present invention to provide an in-mold method and apparatus for efficiently sulfonating a surface of molded plastic articles during the molding operation. It is also an object of the present invention to provide sulfonated plastic articles having a barrier layer thereon relatively free of leachable salts.

These, and other objects and advantages of the present invention, will become apparent from the following detailed description, the accompanying drawing and the appended claims.

BRIEF DESCRIPTION OF THE DRAWING

The FIGURE is a schematic of the system of the present invention.

DETAILED DESCRIPTION OF THE PREFERRED EMBODIMENTS

Referring to the drawing FIGURE there is shown a schematic of the system of the preferred embodiment of the present invention. Mold 10 as shown generally illustrates a blow molding operation for molding thermoplastic resins into plastic articles such as plastic containers, but other types of molding operations such as counter-current injection molding ones, may also use the in-mold sulfonation system of the present invention. Likewise, while polyolefin resins are the preferred thermoplastic resins to be molded, others may also be used. Suitable thermoplastic polymers include addition-type homopolymers and copolymers and blends thereof prepared from the aliphatic alpha-monoolefins, aliphatic conjugated and nonconjugated dienes, trienes and polyenes, halogenated aliphatic olefins, alpha-beta-ethylenically unsaturated carboxylic acids, vinyl esters of nonpolymerizable carboxylic acids, alkyl esters of alpha-beta-ethylenically unsaturated carboxylic acids, monovinylidene aromatic monomers, alpha-beta-ethylenically unsaturated nitriles and amides, ethylenically unsaturated ethers and ketones and other ethylenically unsaturated monomers which polymerize across the ethylenic bond to form polymers having linear carbon to carbon backbone molecular structure with a plurality of free hydrogen atoms attached to the chain and/or attached to carbon atoms of the substituents of the chain. Also included as suitable thermoplastic resins are the condensation-type polymers exemplified by the polyamides such as nylon, the polyimides, the polyesters such as polyethylene terephthalate, the polycarbonates derived from dihydric phenols such as bisphenol A, the polyethers and the like. Organic polymers of special interest are the thermoplastic addition homopolymer, copolymers and mixture of polymers of the following monomers; the aliphatic monoolefins such as ethylene, propylene, butene-1 and isobutylene; aliphatic conjugated dienes such as butadiene; monovinylidene aromatic monomers such as styrene and $\alpha,\beta$-ethylenically unsaturated nitriles such as acrylonitrile.

As shown, mold 10 has jaws 12 and 14 between which a parison of thermoplastic resin (not shown), preferably a high density polyethylene, is placed. The jaws 12 and 14 are then closed. Heat and fluid (air) pressure are applied to expand or blow the parison into the shape of the mold cavity. For a relatively high density polyethylene plastic container, the fluid pressure involved in doing so is around 80–100 psi, preferably about 80 psi and the temperature involved is approximately 110° to 180° C. At these temperatures and pressures it generally takes 0.1 to 0.4 minutes to expand fully a parison for a 10 to 25 gallon plastic container such as a vehicle gasoline tank.

At the same time or prior thereto, a charge of preferably pure liquid sulfur trioxide at about 25° C. is pumped by pump 16 from liquid sulfur trioxide supply source 18 and injected into pre-mold chamber 20. In pre-mold chamber 20 the liquid sulfur trioxide is heated to above its boiling point (approximately 44° C. at 1 atm.) to convert the liquid sulfur trioxide to a gaseous sulfur trioxide. Preferably the pre-mold chamber is at a temperature of approximately 80° to 140° C., most preferably about 100° C. At the same time, the pressure of the gaseous sulfur trioxide is increased to around 100–120 psi, preferably about 100 psi, to provide in pre-mold chamber 20 a relatively high pressure pure (nearly 100%), gaseous sulfur trioxide. It is desirable to use a pressure sensor which allows the pump to operate as long as the pressure is not too high. Thus, the charge of liquid sulfur trioxide is injected into pre-mold chamber at lower pressures. The pressure increase in pre-mold chamber 20 is sensed. Pump 16 shuts down when a pressure level of 100 to 120 psi is reached in pre-mold chamber 20. This system makes it possible to inject a precise amount of liquid sulfur trioxide into the system (which is relatively easy to do as compared to trying to inject gaseous sulfur trioxide) and, then, efficiently and effectively convert the liquid sulfur trioxide to relatively high pressure gaseous sulfur trioxide.

Immediately upon or shortly before full expansion of the plastic container in mold 10, valve 22 is opened. Because pump 16 has at this stage been shut down following injection of the charge of liquid sulfur trioxide into pre-mold chamber 20 thereby closing the fluid connection between pre-mold chamber 20 and liquid sulfur trioxide supply source 18, and because the pressure of the gaseous sulfur trioxide in pre-mold chamber 20 is relatively higher than the pressure in mold 10, upon opening valve 22, the gaseous sulfur trioxide in pre-mold chamber 20 flows through fluid communication line 24 into the mold cavity. Actually, because the parison is preferably fully expanded at this stage, the gaseous sulfur trioxide is introduced into the interior of the formed plastic container. But, reference to introduction of gaseous sulfur trioxide into the mold cavity and into contact with a surface of the formed plastic article is intended to cover this situation as well. In any event, upon its introduction the gaseous sulfur trioxide will sulfonate the interior surface of the plastic container. Thus if 100 psi, hot, pure, gaseous sulfur trioxide is introduced into the mold cavity, it will raise the pressure in the mold cavity to approximately 90 psi. It will also convert the air in the mold cavity to about 80% air and 20% sulfur trioxide. At those levels, and after 0.1 to 1.2 minutes, surface sulfonation will take place.

The timing of the sulfonation step is important in terms of the properties of the barrier layer produced. At the preferred stage, i.e. immediately before or immediately after full expansion of the parison and before any substantial cooling of the plastic container in mold 10, the formed plastic container is at approximately 160° C. to 80° C. At that temperature, little or no $SO_3$ is captured by the R—$SO_3$H groups on the surface of the plastic container (R being the hydrocarbon of the thermoplastic resin). Upon neutralization with, for example, ammonia gas, R—$SO_3^-NH_4^+$ groups are formed and a minimum of leachable salt is produced.

This is not true, at lower temperatures such as those encountered if the formed plastic container is allowed to significantly cool in mold 10 (i.e. mold temperatures of 60° C. to 20° C.) or those encountered in post-mold sulfonation processes. Under those conditions, it has been found that the R—$SO_3$H groups tend to capture $SO_3$ and form R—$SO_3$—$SO_3$H. Upon neutralization with ammonia not only is a R—$SO_3^-NH_4^+$ barrier layer formed, but there is also formed $NH_2SO_3NH_4$ (ammonium sulfamate), which is a rinseable salt.

When the molding temperature is too high, the R—$SO_3$H groups tend to combine forming R—$SO_2$—R (a polymeric sulfone) and $H_2SO_4$. As $H_2SO_4$ has a very high boiling point, it does not evaporate during air flushing, it remains on the surface of the plastic container, and it is neutralized by $NH_3$ to give $(NH_4)_2SO_4$ (ammonium sulfate), which is also a rinseable salt.

In addition, when the molding temperature is too high, the R—$SO_2$—R formation to a degree connects adjacent polymer chains, crosslinking them, and leading on a macroscale to a surface layer which is not readily extendable. This leads to surface regions which are not properly sulfonated, giving the sulfonated surface the appearance of "stretchmarks".

Non-uniform surface sulfonation can also occur if the sulfonation step takes place too soon. Thus, if there is a significant degree of sulfonation which takes place before full expansion of the plastic container, the sulfonated portion of the surface resists expansion, the expansion which does take place is in the poorly sulfonated regions, and "stretchmarks" are created. Because of the non-uniform surface sulfonation, the barrier properties are also not uniform. This makes the plastic container less desirable as a container for organic fluids.

After the gaseous sulfur trioxide is introduced into the mold cavity, valve 22 is closed. Pump 16 is then activated and pre-mold chamber 20 is recharged with sulfur trioxide, preferably pure liquid sulfur trioxide, to make ready for the next molding cycle. Following the sulfonation step the mold cavity is vented and the air/gaseous sulfur trioxide mixture flushed from the mold cavity. Thereafter, any sulfonic acid groups on the sulfonated surface of the plastic article are neutralized. This is preferably with a gaseous neutralizing agent such as ammonia or other gaseous amine; although, other neutralizing agents such as lime slurry or caustic may be used but these are not preferred because they are non-gaseous and require rinsing. Air or nitrogen with about 1% $H_2O$ (based on $NH_3$) is used as a carrier for the ammonia gas in the preferred system.

Following neutralization, any remaining gaseous neutralizing agent and gaseous reaction products are vented/flushed from the mold cavity. Preferably this is accomplished by venting and, then, using dry air to flush the gases from the mold cavity as the formed plastic container cools in mold 10. The vented/flushed gases may be passed through a scrubber as is conventional. Thus, a scrubber with a water spray may be used to convert gaseous sulfur trioxide which is vented/flushed from the mold cavity prior to neutralization to a dilute sulfuric acid. Then, upon venting/flushing after neutralization, the excess ammonia neutralizes the effluent in the scrubber. After neutralization, venting, and flushing, the plastic article is removed from mold 10 and the molding cycle is repeated.

An in-mold sulfonation system of this type is generally more efficient than existing post-mold sulfonation systems.

In addition, because the instant system preferably uses pure gaseous sulfur trioxide, because the air in the mold cavity into which the sulfur trioxide is introduced is hot (and therefore relatively dry) and because the carrier gas for the neutralizing agent has a controlled degree of moisture present, less rinseable salt is produced.

These advantages are further illustrated by the following working example:

EXAMPLE I

A lab simulation of in-mold sulfonation was conducted using preheated polyethylene coupons, thereby avoiding use of an entire blow molding unit in this experiment. The temperatures that were used in the experiment were held constant for the duration of the test and did not cool off as the polyethylene would during actual blow molding. To overcome this and to better simulate an in-mold sulfonation, select temperatures were used covering the molding range (85° C.-105° C.) under a variety of sulfonation conditions. The $SO_3$ partial pressures were manipulated to achieve an adequate sulfonation concentrations in the range of 15% to 25% $SO_3$. The sulfonations, purgings and neutralizations were accomplished in separate varying short exposures (15 sec. to 1 minute) to simulate the timing allowed in the blow molding itself. The results are shown in the various tables below:

TABLE IA

| 30 Second Sulfonation with 22% $SO_3$ | |
|---|---|
| Temperature Degrees Centigrade | Sulfonation Level Micrograms $SO_3/cm^{-2}$ |
| 25° C. | 75 |
| 55° C. | 110 |
| 65° C. | 165 |
| 75° C. | 300 |
| 85° C. | 375 |
| 95° C. | 630 |
| 105° C. | 600 |

As can be seen in Table IA, at a set percentage $SO_3$, the level of surface sulfonation is dramatically increased at elevated temperatures. The minimum temperature required to reach adequate sulfonation appears to fall at about 65°-70° C. for a 30 second sulfonation with 22% $SO_3$. At elevated temperatures (75° C. to 105° C.) adequate sulfonation levels of over about 200 micrograms $SO_3/cm^{-2}$ are achieved. Those temperatures correspond to the low to middle of the range at which the plastic article resides immediately following formation in a blow molding process.

TABLE IB

| Sulfonation with 22% $SO_3$ at 85° C. | |
|---|---|
| Time Seconds | Sulfonation Level Micrograms $SO_3/cm^{-2}$ |
| 10 | 150 |
| 15 | 250 |
| 20 | 275 |
| 25 | 350 |
| 30 | 375 |

TABLE IB-continued

| Sulfonation with 22% $SO_3$ at 85° C. | |
|---|---|
| Time Seconds | Sulfonation Level Micrograms $SO_3/cm^{-2}$ |
| 60 | 530 |

TABLE IC

| Sulfonation with 22% $SO_3$ at 95° C. | |
|---|---|
| Time Seconds | Sulfonation Level Micrograms $SO_3/cm^{-2}$ |
| 10 | 225 |
| 15 | 310 |
| 20 | 380 |
| 25 | 440 |
| 30 | 630 |
| 60 | 570 |

TABLE ID

| Sulfonation with 22% $SO_3$ at 105° C. | |
|---|---|
| Time Seconds | Sulfonation Level Micrograms $SO_3/cm^{-2}$ |
| 10 | 210 |
| 15 | 325 |
| 20 | 425 |
| 25 | 515 |
| 30 | 600 |
| 60 | — |

Tables IB-ID represent the sulfonation level as a function of sulfonation time (seconds), using a concentration of 22% $SO_3$ at the temperatures of 85° C., 95° C., and 105° C., respectively. As expected, an increase in sulfonation time correlates with an increase in the level of surface sulfonation. At a temperature of 85° C. the sulfonation level increases at a fairly constant rate to a maximum performed sulfonation time of one minute, with an adequate level of surface sulfonation (>200 micrograms $SO_3/cm^{-2}$) being reached at approximately 12.5 seconds of sulfonation. At both 95° C. and 105° C. the increase in sulfonation level is much more rapid, with the adequate sulfonation level being reached at just under 10 seconds.

TABLE IE

| Sulfonation for 30 seconds with mole % $SO_3$ | | |
|---|---|---|
| Temperature Degrees Centigrade | $SO_3$ Partial Pressure % $SO_3$ by volume | Sulfonation Level Micrograms $SO_3/cm^{-2}$ |
| 45° C. | 4 | 50 |
| 45° C. | 6 | 70 |
| 65° C. | 4 | 60 |
| 65° C. | 13 | 140 |
| 85° C. | 18 | 210 |
| 85° C. | 22 | 375 |

Table IE illustrates the relationship between the level of surface sulfonation and the partial pressure of $SO_3$ used during the period of sulfonation. This was compared using the different constant temperatures of 45° C., 65° C. and 85° C., respectively and holding the sulfonation time constant at 30 seconds. The data demonstrate a direct correlation between the concentration of $SO_3$ used for sulfonation and the surface level sulfonation of the polyethylene sample. It appears that the minimum percentage of $SO_3$ required to reach an adequate level of surface sulfonation (>200 micrograms $SO_3/cm^{-2}$) at the low end of the temperature range of the formed plastic article in a typical blow molding process (i.e. around 80° C.) is about 17–18%, and at the middle of the temperature range (i.e. around 105° C.) about 15%.

EXAMPLE II

A fully automatic blow molding machine capable of handling 20–50 lbs. polyethylene at a shot and providing mold clamping pressures of 80–100 psi was used to blow mold high density polyethylene vehicle gasoline tanks. That blow molding machine was outfitted with $SO_3$ sources as shown in the drawing FIGURE.

By opening valve 22 for 1–3 seconds, various concentrations of gaseous sulfur trioxide in the cavity of mold 10 were achieved. Four tanks A–D were prepared in this manner. Sample pieces of treated tanks A–D were taken and analyzed to determine surface concentrations of sulfur per square inch given in microgram $S/cm^2$. The four samples were also given a water rinse, the rinsed-away salt in water analyzed, and the results expressed as gram rinseable salt per $M^2$ surface area. The results are set forth in the following Table:

TABLE II

| Sample | microgram $S/cm^2$ | Rinseable Salt in gram salt/$M^2$ |
|---|---|---|
| A | 14.26 | <0.04 |
| B | 5.43 | 0.08 |
| C | 7.44 | <0.04 |
| D | 24.96 | 0.6 |

It has been determined that at about 22 micrograms $S/cm^2$ a 90 percent reduction in gasoline permeance at 72° F. and 50 percent RH is obtained. At approximately 31 micrograms $S/cm^2$, at least a 98 percent reduction in gasoline permeance at 72° F. and 50 percent RH is achieved. At about 46 micrograms $S/cm^2$ a 98 percent reduction in gasoline permeance at 72° F. is achieved, a 90 percent reduction at 100° F. and an 87 percent reduction at 122° F. For most purposes a 90% reduction in the gasoline permeation rate is sufficient. As can be seen, that level was reached with Sample D. It has also been found that a rinseable salt level of below 1.0 gram/$M^2$ is acceptable in that below those levels there is little danger of formation of clogging the fuel line and or fuel filter. If levels below 1.0 gram/$M^2$ are achieved, then, washing and rinsing are believed to be unnecessary. All samples, including Sample D, have rinseable salt levels below 1.0 gram/$M_2$.

With Sample D an acceptable barrier property was achieved and an acceptable low level of rinseable salt was found. That sample was prepared without exceeding the 2 minute blow molding cycle needed for high speed continuous production. Accordingly, in-mold sulfonation system without the need for rinsing has been demonstrated in this example to be workable.

While certain representative embodiments and details have been shown for purposes of illustrating the invention, it will be apparent to those skilled in the art that various changes in the system disclosed herein may be made without departing from the scope of the invention, which is defined in the appended claims.

What is claimed is:

1. A method for in-mold sulfonating a surface of a plastic article during molding thereof comprising:
    a) forming a thermoplastic resin into a plastic article in a mold by molding at a forming temperature and elevated pressure,
    b) producing a gaseous sulfur trioxide at a pressure which is higher than the molding pressure,
    c) introducing a measured amount of gaseous sulfur trioxide into contact with a surface of said plastic article in the mold while said article is substantially at the forming temperature and before any significant cooling of said plastic article takes place to thereby sulfonate said surface of said plastic article with said gaseous sulfur trioxide to produce a sulfonated surface, and
    d) cooling the molded, surface sulfonated plastic article.

2. The method of claim 1 wherein said thermoplastic resin is a polyolefin.

3. The method of claim 2 wherein said thermoplastic resin is formed by blow molding at approximately 80–100 psi and said relatively high pressure gaseous sulfur trioxide is at a pressure of approximately 100–120 psi.

4. The method of claim 3 wherein said molding takes place at approximately 110° to 180° C., said relatively high pressure gaseous sulfur trioxide is at a temperature of 80° to 140° C., and said plastic article is at approximately 160° to 80° C. during said sulfonating step.

5. The method of claim 4 wherein said sulfonation step lasts approximately 0.1 to 2 min.

6. The method of claim 1 wherein said plastic article is hollow defining an interior and exterior surface and the surface of said plastic article sulfonated is the interior surface.

7. The method of claim 6 wherein said plastic article is a vehicle gasoline tank.

8. The method of claim 1 further including the step of neutralizing any sulfonic acid groups on the sulfonated surface of said plastic article with a gaseous neutralizing agent which contains less than 1 percent by weight of moisture.

9. The method of claim 1 wherein said sulfonating step takes place at a sulfur trioxide concentration of 15–25 percent.

10. The method of claim 1 comprising injecting a charge of liquid sulfur trioxide into a premold chamber and producing said relatively high pressure gaseous sulfur trioxide from said liquid sulfur trioxide.

11. The method of claim 10 wherein said liquid sulfur trioxide is essentially pure sulfur trioxide and said gaseous sulfur trioxide is nearly 100% sulfur trioxide gas.

* * * * *